United States Patent
Yu et al.

(10) Patent No.: US 10,732,611 B2
(45) Date of Patent: Aug. 4, 2020

(54) SYSTEM AND METHOD FOR GENERATING MACHINING CONTROL DATA OF NUMERICAL CONTROL MACHINE TOOL

(71) Applicant: SHENYANG MACHINE TOOL (GROUP) RESEARCH & DESIGN INSTITUTE CO., LTD. SHANGHAI BRANCH, Shanghai (CN)

(72) Inventors: Tao Yu, Shanghai (CN); Rongchang Zhu, Shanghai (CN); Yunjie Tang, Shanghai (CN); Xiao Xia, Shanghai (CN); Qi Huang, Shanghai (CN); Hongwei Liu, Shanghai (CN); Chao Peng, Shanghai (CN); Zhenxia Wang, Shanghai (CN); Peng Zeng, Shanghai (CN); Xiang Fan, Shanghai (CN); Shenggang Cui, Shanghai (CN)

(73) Assignee: SHENYANG MACHINE TOOL (GROUP) RESEARCH & DESIGN INSTITUTE CO., LTD. SHANGHAI BRANCH, Yangpu, Shanghai (CN)

( * ) Notice: Subject to any disclaimer, the term of this patent is extended or adjusted under 35 U.S.C. 154(b) by 218 days.

(21) Appl. No.: 15/529,965

(22) PCT Filed: Jan. 6, 2015

(86) PCT No.: PCT/CN2015/070241
§ 371 (c)(1),
(2) Date: May 25, 2017

(87) PCT Pub. No.: WO2016/082311
PCT Pub. Date: Jun. 2, 2016

(65) Prior Publication Data
US 2017/0343983 A1    Nov. 30, 2017

(30) Foreign Application Priority Data

Nov. 26, 2014 (CN) .......................... 2014 1 0704452

(51) Int. Cl.
*G05B 19/00* (2006.01)
*G05B 19/4099* (2006.01)
(Continued)

(52) U.S. Cl.
CPC ....... *G05B 19/4099* (2013.01); *G05B 19/408* (2013.01); *G05B 19/4097* (2013.01);
(Continued)

(58) Field of Classification Search
CPC .............. G05B 19/408; G05B 19/4097; G05B 19/40937; G05B 19/4069
See application file for complete search history.

(56) References Cited

U.S. PATENT DOCUMENTS

| 7,174,284 B2 * | 2/2007 | Dolansky | G05B 17/02 700/169 |
| 8,024,068 B2 * | 9/2011 | Gray | B25J 9/1602 382/153 |

(Continued)

FOREIGN PATENT DOCUMENTS

| CN | 101794140 A | 8/2010 |
| CN | 103034205 A | 4/2013 |
| CN | 204406148 U | 6/2015 |

OTHER PUBLICATIONS

Liu, Huixia et al.; "Research and Development of a CAD/CAM System Based on B/S Mode for Sheet Metal Unforming and Cutting", Modular Machine Tool & Automatic Manufacturing Technique, pp. 87-89 and 91,2003, No. IO, Oct. 31, 2003 (Oct. 31, 2003).

*Primary Examiner* — Ronald D Hartman, Jr.
(74) *Attorney, Agent, or Firm* — Global IP Services; Tianhua Gu

(57) ABSTRACT

A system (100) and method for generating machining control data of a numerical control machine tool. The system (100) comprises a server (10) and at least one terminal device (30). The server (10) is installed with computer-aided
(Continued)

manufacturing software, a numerical control machine tool model library and a cutter and fixture library. The terminal device (30) is connected to the server (10) through the Internet (20) to generate machining program data of a part model and/or to carry out machining simulation of a part model. The method for generating machining control data of a numerical control machine tool comprises: sending a part model file to the server (10) through the Internet (20); and generating program code that can be executed by the numerical control machine tool. The system (100) and the method have the beneficial technical effects of being convenient to operate, low in cost and flexible and easy to use and so on.

19 Claims, 4 Drawing Sheets

(51) Int. Cl.
    *G05B 19/4097* (2006.01)
    *G05B 19/408* (2006.01)

(52) U.S. Cl.
    CPC .............. *G05B 2219/34038* (2013.01); *G05B 2219/34039* (2013.01)

(56) References Cited

U.S. PATENT DOCUMENTS

| | | | | |
|---|---|---|---|---|
| 8,725,283 B2* | 5/2014 | Gray | ................. | G05B 19/4069 700/103 |
| 9,869,994 B2* | 1/2018 | Ogawa | ............... | G05B 19/4097 |
| 2003/0050726 A1 | 3/2003 | Jaffrey | | |
| 2003/0171841 A1* | 9/2003 | Porter | ................. | G05B 19/4097 700/179 |
| 2004/0267508 A1* | 12/2004 | Huang | ............... | G05B 19/4069 703/7 |
| 2005/0010325 A1* | 1/2005 | Dai | .................... | G05B 19/4093 700/179 |
| 2007/0061037 A1* | 3/2007 | Grossmann | ........ | G05B 19/4069 700/182 |
| 2008/0275589 A1* | 11/2008 | Hacklander | .......... | G05B 19/414 700/159 |
| 2009/0204249 A1* | 8/2009 | Koch | ................. | G05B 19/4097 700/108 |
| 2009/0265030 A1* | 10/2009 | Huang | ............... | G05B 19/4068 700/182 |
| 2009/0302496 A1* | 12/2009 | Lukis | .................. | B29C 33/3835 264/221 |
| 2012/0065767 A1* | 3/2012 | Oiwa | .................... | G05B 19/409 700/180 |
| 2012/0290122 A1* | 11/2012 | Morfino | ............ | G05B 19/4069 700/184 |
| 2013/0262065 A1* | 10/2013 | Erdim | ................ | G05B 19/4069 703/7 |
| 2014/0163720 A1* | 6/2014 | Nelaturi | .................. | G06T 15/40 700/186 |
| 2014/0200706 A1* | 7/2014 | Pruschek | ............... | G05B 17/02 700/159 |
| 2015/0039122 A1* | 2/2015 | Barakchi Fard | .... | G06F 17/5009 700/186 |
| 2015/0277436 A1* | 10/2015 | Kalmar-Nagy | ............................. | G05B 19/40937 700/187 |
| 2016/0179085 A1* | 6/2016 | Seitz | .................... | G05B 19/414 700/180 |
| 2017/0308057 A1* | 10/2017 | Kreidler | ............ | G05B 19/4069 |

* cited by examiner

SYSTEM AND METHOD FOR GENERATING MACHINING CONTROL DATA OF NUMERICAL CONTROL MACHINE TOOL

CROSS REFERENCE TO RELATED PATENT APPLICATION

The present application is the US national stage of PCT/CN2015/070241 filed on Jan. 6, 2015, which claims the priority of the Chinese patent application No. 201410704452.8 filed on Nov. 26, 2014, which applications are incorporated herein by reference.

FIELD OF INVENTION

The invention overall relates to the field of manufacturing intelligentization and computer aided manufacturing, in particular to a cloud-based system and method for generating machining control data of a numerical control machine tool intelligently.

DESCRIPTION OF RELATED ARTS

The computer aided manufacturing (CAM) software has been widely used in machining field nowadays. Technicians may simulate a to-be-manufactured part model through the computer aided manufacturing software in computers without consuming any real processing materials, furthermore, the technicians may repeatedly modify and estimate rationality and feasibility of manufacturing procedures and strategies. Most of these applications are embodied as desktop client application software in personal computers.

Client characteristics of such products mentioned above determine that they have corresponding requirements on operating system environment, software environment and hardware environment and the like of user's computers. For example, if a software is developed in a WINDOWS operating system, it cannot be used in a LINUX operating system. Also, the software requires meeting the supporting from some fundamental software framework, discrete graphics cards and so on. Furthermore, a user has to install the software by himself or by asking a specialized person. A user needs to learn and to master a large amount of use skill of software, and the user may need to relearn if the software is changed. Furthermore, it requires a certain labor, material and financial resources for acquisition cost and subsequent update and maintenance of software.

In this case, a new system or method is demanded to solve problems mentioned above in the art.

SUMMARY OF THE PRESENT INVENTION

In order to overcome the above existing technical problems in the prior art, the present invention discloses a system and method for generating machining control data of a numerical control machine tool.

The system for generating machining control data of the numerical control machine tool according to the invention comprises: a server installed with a computer aided manufacturing software, a numerical control machine tool model library and a cutter-and-fixture library, and at least one terminal device which accesses the server through the Internet to generate machining program data of a part model and/or to perform machining simulation of the part model.

The terminal device according to the invention employs a built-in browser to access the server. The terminal device may be connected to the Internet in a wireless mode. And, the terminal device includes, for example, a personal computer, a numerical control device, a cellphone and/or a tablet computer and so on. In one implementation, the server provides an operation interface to the terminal device in a webpage mode.

The invention further provides a method for generating machining control data of a numerical control machine tool, which comprises: sending a part model file to a server through the Internet; and generating program codes that are executable by the numerical control machine tool.

In one embodiment mode, the generating program codes that are executable by the numerical control machine tool comprises: determining a machining mode of the part model; acquiring sizes of the part model; selecting sizes of a blank; acquiring machining information of the part model; selecting a machining device, a cutter and/or a fixture with a built-in server; and generating program codes that are executable by the numerical control machine tool according to the acquired parameter information of the part model.

In one embodiment mode, the method further comprises: online displaying a simulative manufacturing process of the part model.

The method further comprises: loading the generated program codes into the numerical control machine tool for machining.

Wherein, acquiring machining information of the part model comprises: selecting a machining surface or picking a surface point of the part.

In summary, the technical solutions of the invention have following beneficial technical effects:

The user may perform remote operation across platforms and devices due to Internet characteristics of a website. For instance, the user may edit a part model file at home and then upload the file to a system to perform required operation. The user may also login the system at other places to perform operations, e.g., machining, etc.

It may reduce the use's software/hardware cost of software, operation systems and so on by employing a browser-and-server mode, without purchasing and installing any expensive commercial processing software on the user's terminal device, which greatly saves cost.

In the invention, relevant information, such as numerical control codes, manufacturing strategies and machining stimulation etc., can be acquired by guiding the user to simply set parameters through a guidance interface, without the need for the user to learn and record a large amount of software operation manners, which greatly lowers difficulty level of utilizing the CAM software system.

In the invention, a numerical control machine tool model library and a complete cutter-and-fixture library are built in the server of the system. The user may directly select a required 3D model of the machine tool and a machining cutter on the server's website and thus save modeling time of the machine tool and the cutter.

Furthermore, because all the information is stored in the server, the user may continuously perform a same working procedure by different devices at different places. Meanwhile, in the invention, a pre-made machining device of the system is debugged with actual devices, which guarantees accuracy of results due to its complete matching.

BRIEF DESCRIPTION OF THE DRAWINGS

Further illustration of this invention is made with reference to the drawings and exemplary embodiments.

DETAILED DESCRIPTION OF THE PREFERRED EMBODIMENTS

Detailed implementations of this invention are further described in combination with the drawings. The detailed description of implementations according to this invention herein below includes some very specific technical features for better understanding of this invention; however, it should be obvious for a skilled person in the art that not every technical feature from the description is an essential technical feature to implement this invention. Some detailed implementations described herein below should be understood as exemplary embodiments of this invention, and should not be construed as limiting of this invention.

Figure 1:
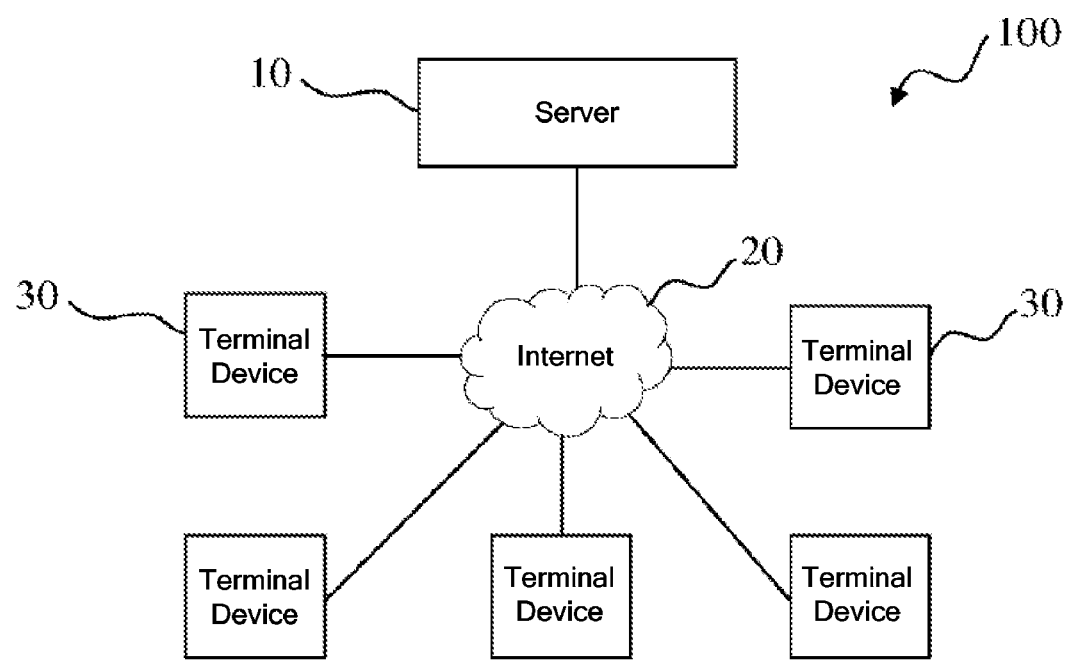
FIG. 1 illustrates a schematic block diagram of one exemplary implementation of a system for generating machining control data of a numerical control machine tool according to this invention.

FIG. 1 is a schematic block diagram of one exemplary implementation of a system for generating machining control data of a numerical control machine tool according to this invention. The system 100 comprises a server 10 and at least one terminal device 30, wherein, the server 10 is installed with a computer aided manufacturing software, a numerical machine tool library and a cutter-and-fixture library. The terminal device 30 is connected to the server 10 through the Internet 20, to generate manufacturing procedure data of a part model and/or to perform machining simulation of the part model by the computer aided manufacturing software, the numerical machine tool library and the cutter-and-fixture library built in the server 10.

The terminal device 30 may employ a built-in browser to access the server through the Internet. The server may provide an operation interface of a webpage mode for the user using the terminal device to guide the user to operate and use the CAM software through the terminal device. The webpage may employ such as HTML and JAVASCRIPT as fundamental carriers, and communicate with the server in an AJAX mode. Therefore, the terminal device of the invention only needs to meet the requirements for installing browser, with no requirement for installing a computer aided manufacturing software having high demand for hardware and high cost, and with no requirement for installing other databases, such as a numerical control machine tool model library or a cutter-and-fixture library etc., thereby the requirements for both hardware and software of the terminal device are lowered and the user's cost is saved.

Furthermore, the user employs the terminal device to access the server through the browser, which facilitates the user to achieve the machining stimulation of the part model on the numerical control machine tool and/or to generate corresponding machining procedure program codes of the part model at different places.

The terminal device may be a personal computer, a numerical control device such as a numerical control machine tool, a cellphone or a tablet computer and the like.

The server is used for the machining simulation and the generation of machining procedures. The generated machining procedure data includes but not limited to cutter types, machining paths, machining sequences and so on. The machining procedure data is stored in the server, which facilitates the user to repeatedly access the server to carry out a same working process at different places and different times. The server may takes charge of the management of a related simulation process, such as a simulation and interaction, etc., to avoid confusion, and the user's webpage may be automatically standby when there is no idle seat.

Figure 2:
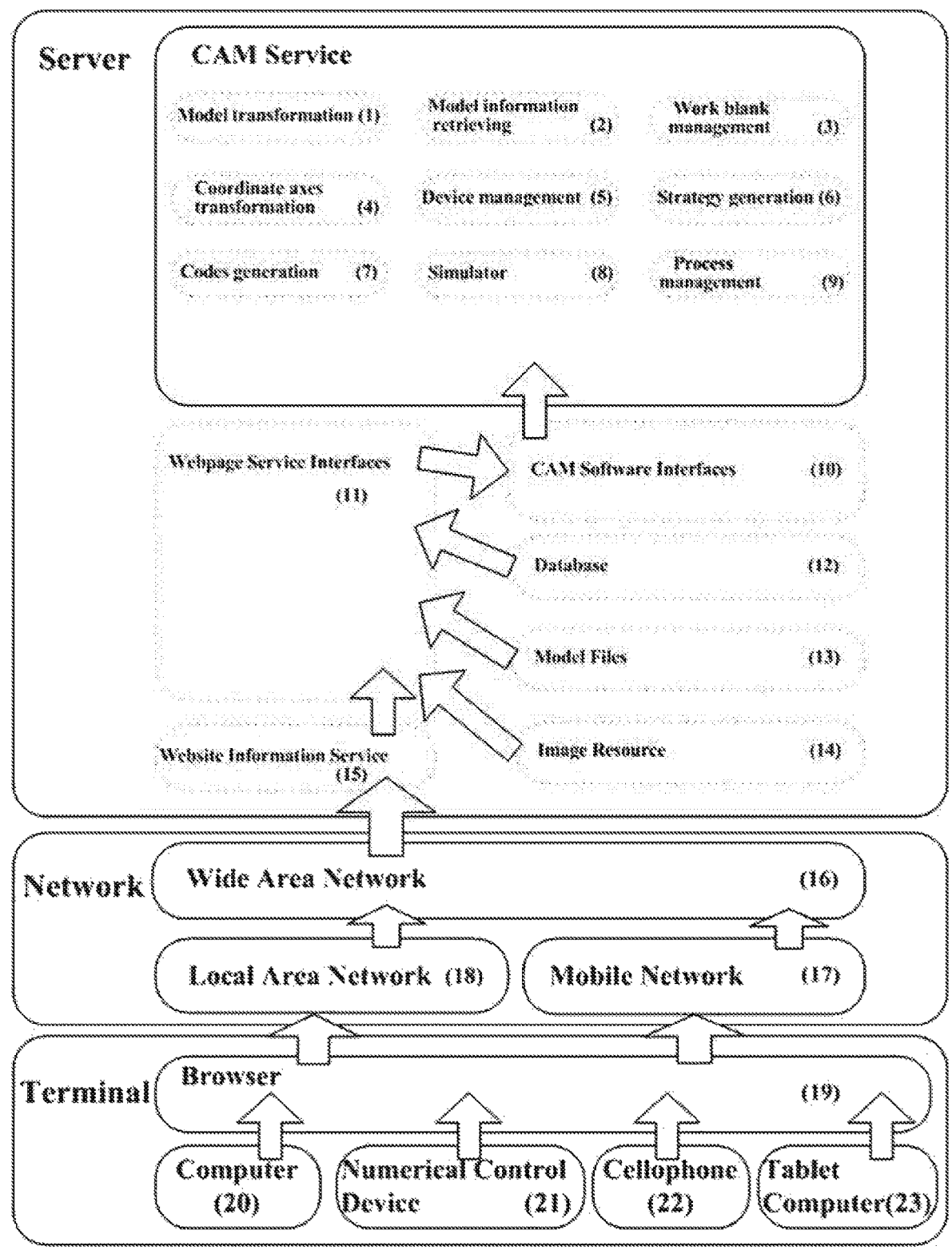
FIG. 2 illustrates a schematic block diagram of another exemplary implementation of the system for generating machining control data of the numerical control machine tool according to this invention.

FIG. 2 is a schematic block diagram of another exemplary implementation of the system for generating machining control data of the numerical control machine tool according to this invention. Referring to FIG. 2, the system 200 includes a server, the Internet and a terminal device, wherein the terminal device is connected to the server through the Internet, so that the user may access the server through the terminal device.

The server is installed with a computer aided service software, and thus the server has: (1) a model transformation function, which may transforms part model files of various formats to a general format, e.g., a format used in the system and a required format for webpage displaying in the meanwhile; (2) a model information extraction function, which may extract information, e.g., the size and machining manners of the model and the like; (3) a blank management function, which may take charge of the management of the blank library; (4) a coordinate axes transformation function, which may generate machining strategies after the transformation of the coordinate axes; (5) a device management function, which takes charge of the management of the machining device, the cutter and fixture and the like; (6) a strategy generation function, which generates a machining strategy according to the existing resource and information; (7) a code generation function, which may generate machining program codes of the part model; (8) a simulator, which may provide a machining simulation animation of the part model; (9) a process management function, which may manages the process of software.

Besides, the server also includes: (10) a CAM software interface module, since the webpage may be written by various programming languages, the CAM software may subdivide a large amount of functions and provide programming interfaces suitable for mainstream programming language, which facilitates the developers to call functions to accomplish complex functions; (11) a web service interface module, and interfaces of the server, which face webpage or other front-end code, follow a Web Service rule; (12) a database module, including a CAM software database and a server website system database for permanent preservation of information; (13) a model file module, which may store various model files and intermediate files; (14) an image resource module, including such as image resources related to the website; (15) a website information service module, including such as a general website server software.

The system according to this invention also includes: (16) a wide area network, which may be a national and international internet, with the terminal device being connected to the server through the Internet; (17) a mobile network, including such as a wireless network for connecting mobile devices, by which the terminal device may be connected to the Internet in a wireless mode; (18) a local area network, including such as a local area network of an enterprise or small area, by which the terminal devices in the local area network may be connected to the Internet through the local area network.

The terminal devices may comprise, such as: (20) a computer, including such as a personal computer; (21) a numerical control device, which is a modern numerical control device having certain hardware and software conditions; (22) a cellphone, such as a smartphone or a portable terminal having certain hardware and software conditions; (23) a tablet computer, such as a tablet computer device having certain hardware and software conditions. The terminal devices mentioned above may be installed with: (19) a browser, which includes such as browsers installed on a terminal device of various types.

Figure 3:
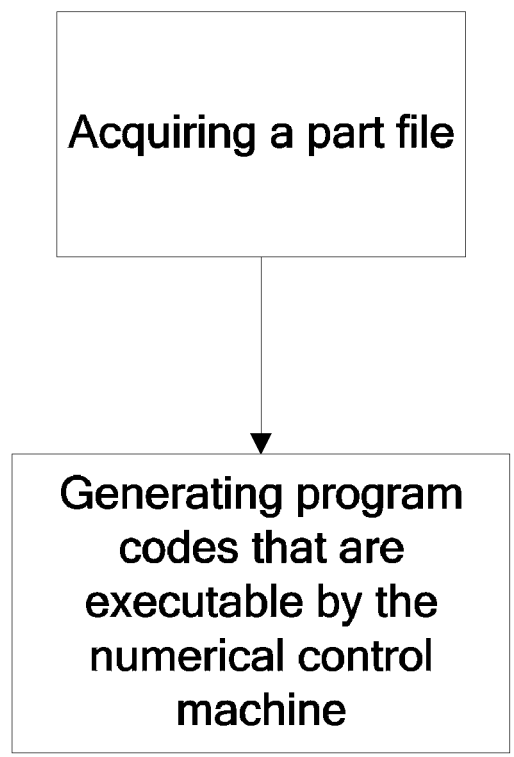
FIG. 3 illustrates a flowchart of one exemplary implementation of a system for generating machining control data of the numerical control machine tool according to this invention.

Besides, in another implementation, the invention further provides a method for generating machining control data of the numerical control machine tool, as shown in FIG. 3, which includes following steps: 1. acquiring a model file, for example, it may send 3D part model from local or network resource to a server website platform through various kinds of network communication modes (such as a FTP and so on); 2. generating program codes that are executable by the numerical control machine tool by the server.

Figure 4:
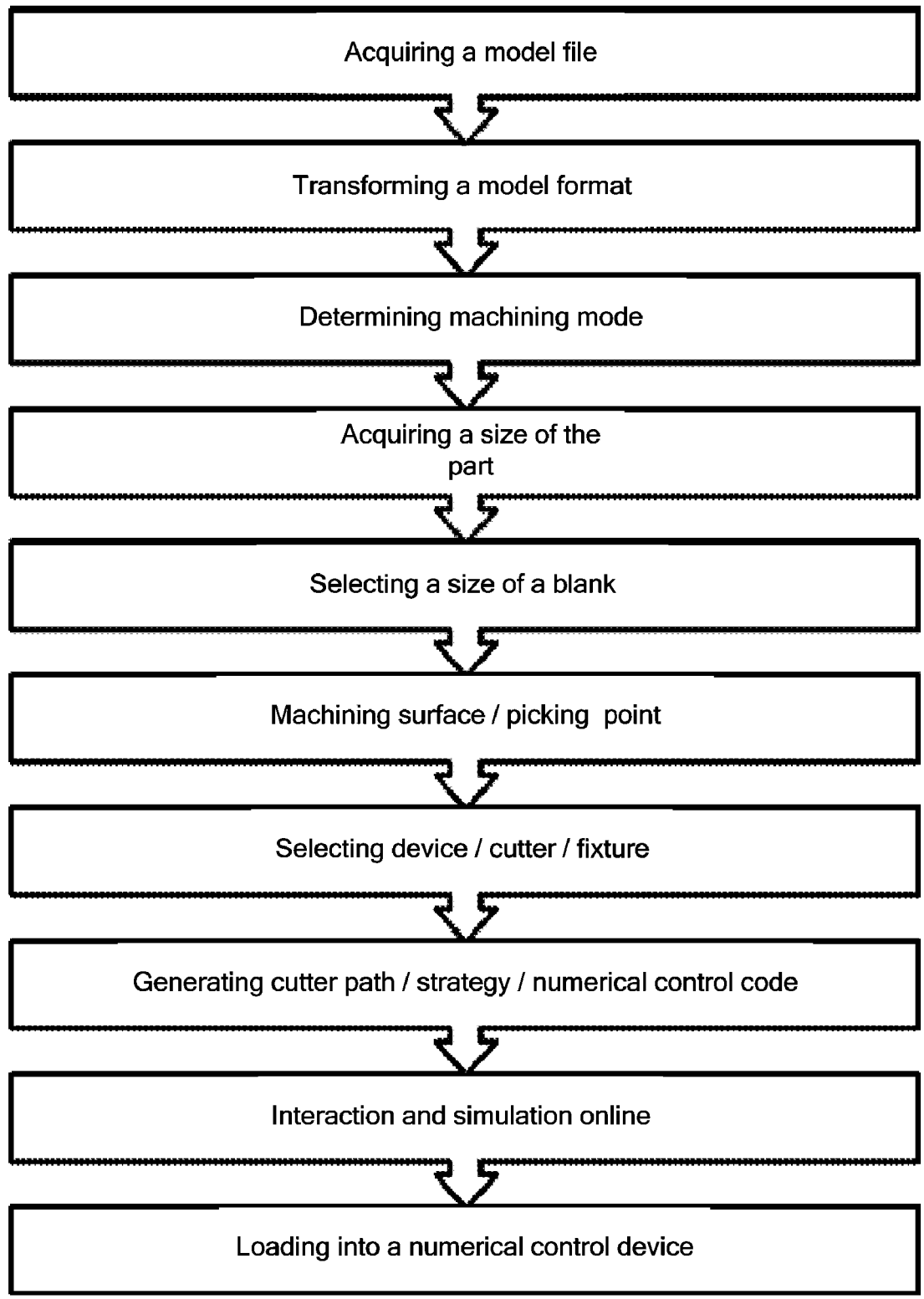
FIG. 4 illustrates a flowchart of another exemplary implementation of a system for generating machining control data of the numerical control machine tool according to this invention.

In another implementation, the invention provides a method for generating machining control data of the numerical control machine tool, as shown in FIG. 4, the method includes following steps: 1. acquiring a model file, for example, it may send 3D part model from local or network resource to a server website platform through various kinds of network communication modes (such as a FTP and so on); 2. transforming the format of the part model file, therein, the server automatically uniformly formats the 3D part model files of various formats to transform into formats used in the system, and transforms into the format required for webpage displaying at the same time; 3. determining the machining manner of the part model, such as milling, lathing and the like; 4. acquiring a size of the part, such as a length, width, height or diameter and the like; 5. selecting a size of the blank, for example, the user may manually selects a corresponding size of the blank in the system, or the system itself may select an appropriate blank; 6. selecting a machining surface or picking a surface point of the part to acquire the machining information; 7. selecting a built-in machining device, cutter, fixture and the like of the system; 8. by using the acquired parameter information, generating a machining strategy, displaying machining cutter path and automatically generating numerical control codes that are executable by the numerical control machine tool. Optionally, the method further includes a process for online displaying the machining simulation to provide interactive operations for the user, such as start, stop, zoom in-or-out, rotate and the like. Optionally, the method further includes storing the generated machining program data in the server. Optionally, the method further includes loading the generated numerical control program codes into the numerical control machine device to carry out machining.

In the abovementioned embodiments according to this invention, one or more characteristics illustrated in one embodiment may be combined with any of one or more characteristics illustrated in another embodiment, without departing from the scope of the description of each embodiment in this disclosure.

Although the abovementioned embodiments illustrate at least one exemplary implementation, it should be understood that there are many variants of this invention. It should be also understood that the one or more exemplary implementations are only illustrative, rather than intending to limit the scope, feasibility and configuration of this invention in any manners. Meanwhile, although the forgoing embodiments have been explained in some details for the object of transparent understanding, obviously, some modifications and improvements be implemented within the scope of appending claims. Therefore, the embodiments of this invention should not be construed as limiting, but merely as exemplifications; and embodiments of this invention are not limited in the details given from this specification but available to be modified within the scope or the equivalent scope of appending claims.

What is claimed is:

1. A system for generating machining control data of a numerical control machine tool, comprising:
   a server, which is installed with a computer-aided manufacturing software, a numerical control machine tool model library and a cutter-and-fixture library, wherein the server comprises a simulator, which online displays a simulative machining process of a part model to provide interactive operations for a user; and
   at least one terminal device, which accesses the computer-aided manufacturing software, the numerical control machine tool model library, the cutter-and-fixture library through the Internet to generate machining program data of a part model and/or to perform machining simulation of the part model.

2. The system of claim 1, wherein the terminal device is installed with a browser, the server is provided with a webpage with an operation interface for the terminal device, and the browser is suitable for accessing the server.

3. The system of claim 2, wherein the server further comprises: a CAM software interface module, by which the computer-aided manufacturing software is suitable for being invoked by the terminal device.

4. The system of claim 1, wherein the terminal device is connected to the Internet in a wireless mode.

5. The system of claim 1, wherein the terminal device comprises: a personal computer, a numerical control device, a cellphone and/or a tablet computer.

6. The system of claim 1, wherein the server further comprises at least one or more of:
   a model transformation module for transforming part model files of various formats to a general format;
   a model information extraction module;
   a blank management module for managing a blank library;
   a coordinate axes transformation module;
   a device management module;
   a strategy generation module;
   a code generation module, which generates program codes that are executable by the numerical control machine tool;
   a process management module;
   a web service interface module;
   a database module;
   a model file module;
   an image resource module; a web site information service module.

7. A method for generating machining control data of a numerical control machine tool, comprising:
   sending a part model file to a server through the Internet by a terminal device;
   generating program codes that are executable by the numerical control machine tool by a server; wherein generating program codes that are executed by the numerical control machine tool by the server comprises: acquiring parameter information of the part model; and generating program codes that are executable by the numerical control machine tool according to the acquired parameter information of the part model; wherein, the acquired parameter information of the part model comprises: online displaying a simulative machining process of the part model to provide interactive operations for a user;

determining a machining mode of the part model;

acquiring a size of the part model;

selecting a size of a blank;

acquiring machining information of the part model; and selecting a machining device, a cutter and/or a fixture built-in the server.

8. The method of claim 7, wherein the acquired parameter information of the part model further comprises:

determining a machining mode of the part model;

acquiring a size of the part model;

selecting a size of a blank;

acquiring machining information of the part model;

selecting a machining device, a cutter and/or a fixture built-in the server.

9. The method of claim 8 further comprising: storing the program codes that are executable by the numerical control machine tool in the server.

10. The method of claim 9 further comprising:

loading the generated program codes that are executable by the numerical control machine tool into the numerical control machine tool for machining.

11. The method of claim 8, wherein, the step of acquiring machining information of the part model further comprises: selecting a machining surface or picking a surface point of the part, for acquiring the machining information.

12. The method of claim 8 further comprising:

loading the generated program codes that are executable by the numerical control machine tool into the numerical control machine tool for machining.

13. The method of claim 7 further comprising:

loading the generated program codes that are executable by the numerical control machine tool into the numerical control machine tool for machining.

14. A system for generating machining control data of a numerical control machine tool, comprising:

an apparatus for sending a part model file to a server through the Internet; and an apparatus for generating program codes that are executable by the numerical control machine tool; wherein the apparatus for generating program codes that are executable by the numerical control machine tool comprises: an apparatus for online displaying a simulative machining process of the part model to provide interactive operations for a user;

an apparatus for determining a machining mode of a part model;

an apparatus for acquiring a size of the part model;

an apparatus for selecting a size of a blank;

an apparatus for acquiring machining information of the part model;

an apparatus for selecting a machining device, a cutter and/or a fixture built-in the server, and an apparatus for generating program codes that is executable by the numerical control machine tool according to the acquired parameter information of the part model.

15. The system of claim 14, wherein the apparatus for generating program codes that are executable by the numerical control machine tool further comprises:

an apparatus for determining a machining mode of a part model;

an apparatus for acquiring a size of the part model;

an apparatus for selecting a size of a blank;

an apparatus for acquiring machining information of the part model;

an apparatus for selecting a machining device, a cutter and/or a fixture built-in the server; and an apparatus for generating program codes that is executable by the numerical control machine tool according to the acquired parameter information of the part model.

16. The method of claim 15 further comprising: an apparatus for storing the program codes in the server.

17. The system of claim 15, wherein the acquired machining information of the part model is comprised of machining information acquired by selecting a machining surface or picking a surface point of the part.

18. The system of claim 15 further comprising:

an apparatus for loading the generated program codes into the numerical control machine tool for machining.

19. The system of claim 14 further comprising:

an apparatus for loading the generated program codes into the numerical control machine tool for machining.

* * * * *